United States Patent
Ando et al.

(10) Patent No.: US 7,677,375 B2
(45) Date of Patent: Mar. 16, 2010

(54) DRIVE FORCE TRANSMISSION DEVICE

(75) Inventors: Junji Ando, Kariya (JP); Naoyuki Sakai, Anjo (JP); Toshifumi Sakai, Anjo (JP); Toshiyuki Saito, Toyoake (JP); Hajime Fukami, Obu (JP); Kazuyuki Nakanishi, Seto (JP); Hiroyuki Mori, Nisshin (JP); Hideo Tachikawa, Nisshin (JP)

(73) Assignee: JTEKT Corporation, Osaka-shi (JP)

( * ) Notice: Subject to any disclaimer, the term of this patent is extended or adjusted under 35 U.S.C. 154(b) by 364 days.

(21) Appl. No.: 11/512,214

(22) Filed: Aug. 30, 2006

(65) Prior Publication Data

US 2007/0108009 A1    May 17, 2007

(30) Foreign Application Priority Data

Aug. 30, 2005   (JP)   .............................. 2005-248894

(51) Int. Cl.
*F16D 27/115*   (2006.01)
*F16D 13/62*   (2006.01)
*F16D 69/00*   (2006.01)

(52) U.S. Cl. .............. 192/70.12; 192/70.14; 192/84.91; 192/107 M; 192/113.36

(58) Field of Classification Search ............... 192/70.14, 192/113.36
See application file for complete search history.

(56) References Cited

U.S. PATENT DOCUMENTS

| | | | | |
|---|---|---|---|---|
| 2,733,798 A | * | 2/1956 | Almen et al. | ........... 192/113.36 |
| 3,048,250 A | * | 8/1962 | Kershner | ................ 192/107 R |
| 3,972,400 A | | 8/1976 | Howells | |
| 5,029,686 A | | 7/1991 | Yesnik | |
| 6,158,561 A | * | 12/2000 | Sakai et al. | ................... 192/35 |
| 7,455,162 B2 | * | 11/2008 | Epple et al. | ............ 192/113.36 |
| 2003/0106758 A1 | * | 6/2003 | Hirota et al. | .................. 192/35 |
| 2004/0159519 A1 | * | 8/2004 | Gorman et al. | .......... 192/70.12 |
| 2005/0284721 A1 | * | 12/2005 | Arcot et al. | ............... 192/70.12 |

FOREIGN PATENT DOCUMENTS

| | | |
|---|---|---|
| EP | 0 370 476 | 5/1990 |
| EP | 0 881 405 A2 | 12/1998 |
| EP | 1 367 279 A2 | 12/2003 |
| EP | 1 571 365 A | 9/2005 |
| JP | 7-127658 | 5/1995 |
| JP | 8-074905 | 3/1996 |
| JP | 2002213485 A * | 7/2002 |
| JP | 2005-36863 | 2/2005 |
| WO | WO 2005/028907 A1 * | 3/2005 |

OTHER PUBLICATIONS

U.S. Appl. No. 12/089,214, filed Apr. 4, 2008, Ando, et al.

* cited by examiner

*Primary Examiner*—Rodney H Bonck
(74) *Attorney, Agent, or Firm*—Oblon, Spivak, McClelland, Maier & Neustadt, L.L.P.

(57) ABSTRACT

A drive force transmission device has an outer clutch plate and an inner clutch plate, which are rotatable relative to each other about a common rotational axis. The inner and outer clutch plates become frictionally engaged with each other with lubricant oil provided in between. The outer and inner clutch plates each have a sliding surface. The sliding surfaces face each other. A diamond-like carbon film is formed on the sliding surface of the outer clutch plate. Fine grooves are formed in the sliding surface of the inner clutch plate. The proportion of the sliding area to the sliding surface of the inner clutch plate at the initial stage of use is 55 to 90%.

8 Claims, 5 Drawing Sheets $$\text{Proportion of Sliding Area} = \frac{A}{A+B}$$

DRIVE FORCE TRANSMISSION DEVICE

CROSS-REFERENCE TO RELATED APPLICATIONS

This application is based upon and claims the benefit of priority from prior Japanese Patent Application No. 2005-248894, filed on Aug. 30, 2005, the entire contents of which are incorporated herein by reference.

BACKGROUND OF THE INVENTION

The present invention relates to a drive force transmission device that transmits drive force through frictional engagement between drive force transmitting members that are coaxially arranged in a manner rotatable relative to each other.

To improve performance, a drive force transmission device may typically include a plurality of fine grooves formed in a sliding surface of a drive force transmitting member. For example, as described in Japanese Laid-Open Patent Publication No. 2005-36863, a plurality of fine grooves are formed in a sliding surface of one of a drive clutch plate and a driven clutch plate, which form a drive force transmitting member of a drive force transmission device. The grooves extend in parallel with one another in the circumferential direction of the sliding surface. The grooves maintain an appropriate thickness of an oil film formed between the opposing sliding surfaces of the drive and driven clutch plates. In this manner, the sliding surfaces exhibit μ-v characteristics of high friction and positive gradient, which indicates that the friction coefficient μ increases as the sliding speed v increases. Accordingly, the drive force transmission device reliably obtains desired drive force transmission characteristics with improved anti-judder properties.

The sliding surfaces of the drive force transmission device must maintain the desired drive force transmission characteristics even after a certain period of use, or an assumed length of life of the drive force transmission device. Specifically, regardless of wear of the sliding surfaces caused by long-term use, the shape of each of the fine grooves must be maintained in an appropriate state, or an oil film formed between the sliding surfaces must be maintained in a desired state. It is thus ideal that such fine grooves are formed to have rectangular cross-sectional shapes. However, since the fine grooves of such shapes are difficult to form, typical fine grooves have substantially triangular cross-sectional shapes. In other words, the width of each fine groove decreases from the opening end of the groove toward the bottom. If the fine grooves are formed through cutting as in the case of the aforementioned document, the triangular cross-sectional shape of each fine groove becomes more acute. Thus, as the sliding surfaces become worn due to the long-term use, the width of each groove becomes gradually smaller, changing the drive force transmission characteristics. To avoid this problem, each fine groove is formed initially with an increased width at an opening end and an increased depth, in such a manner that a sufficient groove width is maintained regardless of the wear of the sliding surfaces. Therefore, in a typical drive force transmission device, the sliding area (corresponding to the portions other than those corresponding to the grooves) of the sliding surface in which the fine grooves are formed is approximately 50% or smaller of the total area of the sliding surface at the initial stage of use.

However, if each fine groove has an increased width at the opening end, the sliding area of the sliding surface becomes excessively small particularly at the initial stage of use, thus increasing surface pressure. This causes a significant decrease of the width of each fine groove when the sliding surface becomes worn. The drive force transmission characteristics thus greatly change after a long time of use, compared to the initial stage of use.

SUMMARY OF THE INVENTION

Accordingly, it is an objective of the present invention to provide a drive force transmission device that maintains desired drive force transmission characteristics for a long time.

To achieve the foregoing objectives and in accordance with one aspect of the present invention, a device that transmits drive force through frictional engagement between a first drive force transmitting member and a second drive force transmitting member is provided. The first drive force transmitting member and the second drive force transmitting member are rotatable relative to each other about a common rotational axis with a lubricant oil provided in between. The first and second drive force transmitting members each have a sliding surface. The sliding surfaces face each other. A diamond-like carbon film is formed on the sliding surface of the first drive force transmitting member. A fine groove is formed in the sliding surface of the second drive force transmitting member. The proportion of a sliding area to the sliding surface of the second drive force transmitting member at an initial stage of use is 55 to 90%.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the present invention, or a drive force transmission device of a four-wheel-drive vehicle, will now be described with the attached drawings.

Figure 1:
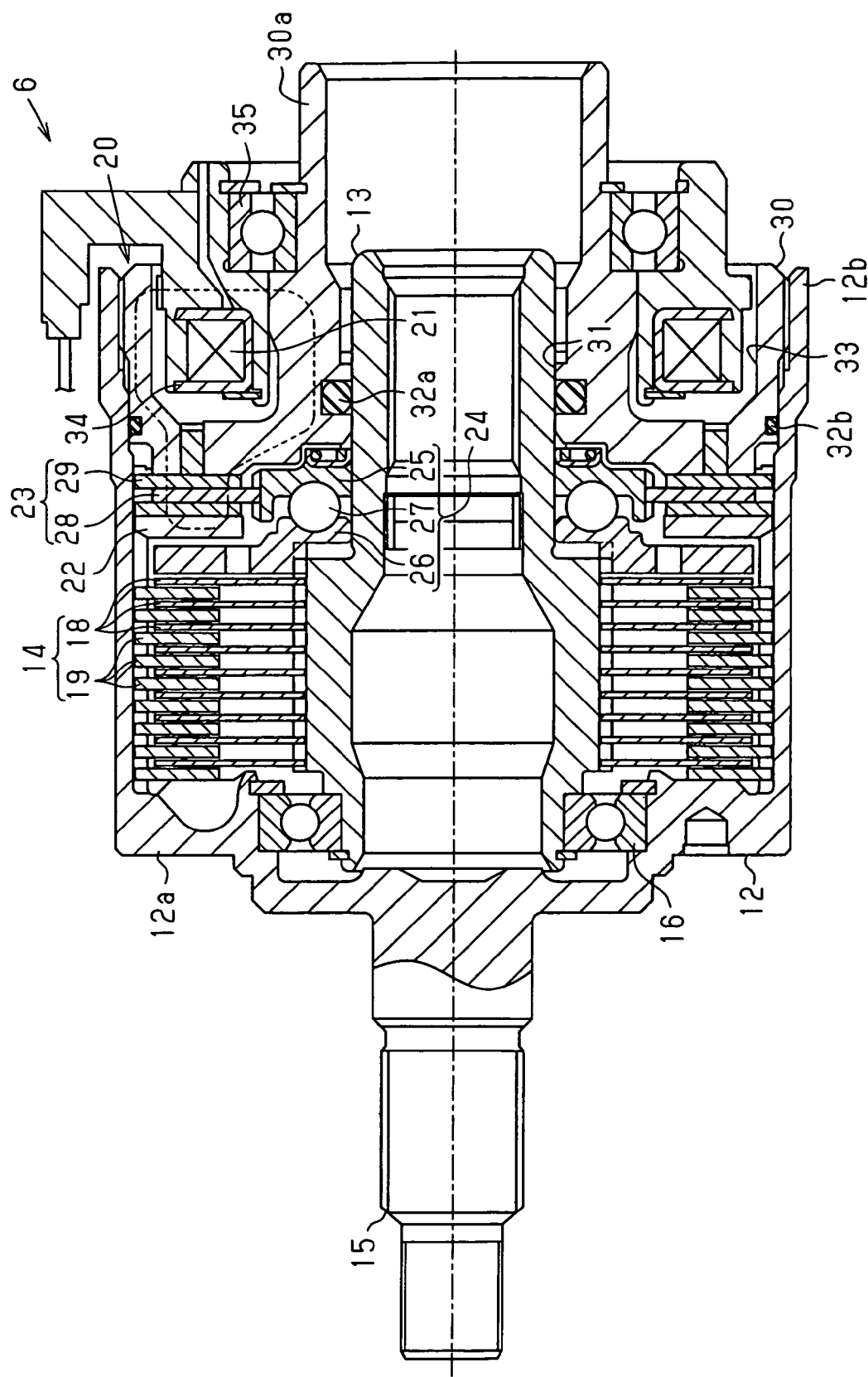
FIG. 1 is a view schematically showing a drive force transmission device.
Figure 2:
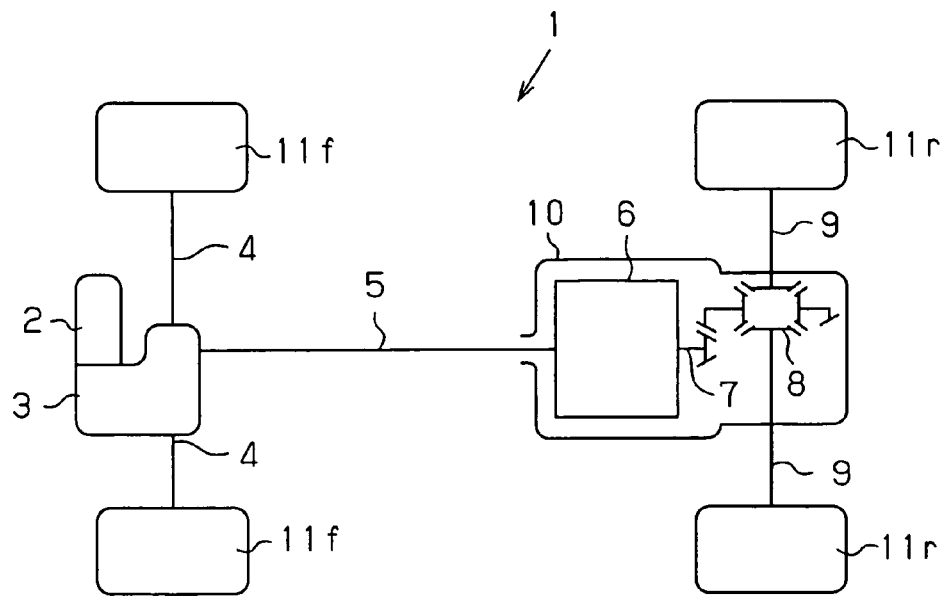
FIG. 2 is a diagram schematically showing a vehicle including the drive force transmission device.

FIG. 1 is a view schematically showing the drive force transmission device. FIG. 2 is a diagram schematically showing the vehicle (the four-wheel-drive vehicle) including the drive force transmission device.

As illustrated in FIG. 2, a vehicle 1 is a front-wheel-drive-based four-wheel-drive vehicle. A transaxle 3 is secured to a side of an engine 2. A pair of front axles 4 are connected to the transaxle 3. A propeller shaft 5 is also connected to the transaxle 3. The propeller shaft 5 is connected also to a pinion shaft (a drive pinion shaft) 7 through a drive force transmission device 6. The pinion shaft 7 is connected to a pair of rear axles 9 through a rear differential 8, or a differential device. In the illustrated embodiment, the drive force transmission device 6, the pinion shaft 7, and the rear differential 8 are accommodated in a differential carrier 10.

The power of the engine 2 is thus transmitted to front wheels 11f through the front axle 4. When the drive force transmission device 6 connects the propeller shaft 5 to the pinion shaft 7 to permit transmission of torque, the power of the engine 2 is transmitted from the pinion shaft 7 to rear wheels 11r through the rear differential 8 and the rear axles 9.

The drive force transmission device 6 of the present invention will hereafter be explained.

As shown in FIG. 1, the drive force transmission device 6 of the illustrated embodiment includes a front housing 12 connected to the propeller shaft 5, an inner shaft 13 connected to the pinion shaft 7, and a main clutch 14. The main clutch 14 is provided between the front housing 12 and the inner shaft 13.

Specifically, in the illustrated embodiment, the front housing 12 is shaped like a cylinder with a closed bottom, or a bottom 12a. A connection shaft 15 projects from the bottom 12a and is connected to the propeller shaft 5. The inner shaft 13 of the illustrated embodiment has a cylindrical shape and is supported by a bearing 16 formed along an inner circumferential portion of the front housing 12. The inner shaft 13 is thus received in the space in the front housing 12 and arranged coaxially with the front housing 12. In this state, the inner shaft 13 and the front housing 12 are rotatable relative to each other. In the illustrated embodiment, axial splines are formed in the outer circumferential surface of the connection shaft 15 and the inner circumferential surface of the inner shaft 13. The front housing 12 and the inner shaft 13 are thus connected to the propeller shaft 5 and the pinion shaft 7, respectively, through the engagement of the splines.

In the illustrated embodiment, the main clutch 14 is a multi-plate friction clutch mechanism including a plurality of inner clutch plates 18 and a plurality of outer clutch plates 19, which are a plurality of drive force transmitting members. The inner clutch plates 18 and the outer clutch plates 19 are arranged alternately. The inner and outer clutch plates 18, 19 are coaxially provided in a manner rotatable relative to each other. Each of the inner clutch plates 18 is engaged with the outer circumferential surface of the inner shaft 13 through the splines. Each of the outer clutch plates 19 is engaged with the inner circumferential surface of the front housing 12 through the splines. In this state, the inner clutch plates 18 and the outer clutch plates 19 are supported in an axially movable manner. When the inner clutch plates 18 contact the corresponding outer clutch plates 19, the inner clutch plates 18 and the outer clutch plates 19 become frictionally engaged. This connects the propeller shaft 5 connected to the front housing 12 to the pinion shaft 7 connected to the inner shaft 13, thus permitting torque transmission between the propeller shaft 5 and the pinion shaft 7. When the inner clutch plates 18 are separated and disengaged from the outer clutch plates 19, the propeller shaft 5 is disconnected from the pinion shaft 7.

The drive force transmission device 6 of the illustrated embodiment has an electromagnetic drive mechanism 20 that causes frictional engagement of the main clutch 14 (or changes the force caused by such frictional engagement). Specifically, the drive mechanism 20 includes an electromagnet 21, or a drive source, an armature 22, a pilot clutch 23, and a cam mechanism 24. The armature 22 moves when drawn by electromagnetic force generated by the electromagnet 21. The armature 22 thus causes the pilot clutch 23 to frictionally engage. The cam mechanism 24 converts frictional engagement force produced by the pilot clutch 23 into pressing force, which is applied to the main clutch 14. The components of the drive mechanism 20 are arranged between the front housing 12 and the inner shaft 13, together with the main clutch 14.

In the illustrated embodiment, the main clutch 14 is provided in the vicinity of the bottom 12a of the front housing 12. In the drive mechanism 20, the cam mechanism 24, the armature 22, the pilot clutch 23, and the electromagnet 21 are arranged in this order from the side corresponding to the main clutch 14 (the side corresponding to the bottom 12a of the front housing 12, the left-hand side of FIG. 1) to an opening 12b of the front housing 12 (the right-hand side of FIG. 1).

More specifically, the cam mechanism 24 of the illustrated embodiment includes a pair of opposing cam members (25, 26), or a first cam 25 and a second cam 26, and a spherical cam follower 27. An annular groove having a V cross-sectional shape is formed in each of the opposing surfaces of the cams 25, 26. The annular grooves of the first and second cams 25, 26 oppose each other. The cam follower 27 is provided between the annular grooves. In the illustrated embodiment, the first cam 25 is arranged closer to the electromagnet 21 and rotatably supported by the inner shaft 13. The second cam 26 is provided closer to the main clutch 14 and engaged with the outer circumferential surface of the inner shaft 13 through the splines. The second cam 26 is thus supported in an axially movable manner.

In the illustrated embodiment, the pilot clutch 23 is a multi-plate friction clutch mechanism like the main clutch 14. The pilot clutch 23 has an inner clutch plate 28 and a pair of outer clutch plates 29, each of which is arranged at the corresponding one of the opposing sides of the inner clutch plate 28 (see FIG. 3). The inner clutch plate 28 is engaged with the outer circumferential surface of the first cam 25 through splines. The outer clutch plates 29 are engaged with the inner circumferential surface of the front housing 12 through the splines. In this state, the inner clutch plate 28 and the outer clutch plates 29 are supported in an axially movable manner.

An annular rear housing 30 is threaded into the opening 12b of the front housing 12. A central bore 31 is defined in the rear housing 30 and receives an end of the inner shaft 13, which is accommodated in the space of the front housing 12. A seal member 32a and a seal member 32b are provided between the inner circumferential surface of the rear housing 30 and the outer circumferential surface of the inner shaft 13, and between the outer circumferential surface of the rear housing 30 and the inner circumferential surface of the front housing 12, respectively.

In other words, in the drive force transmission device 6 of the illustrated embodiment, the space in the front housing 12 that accommodates the main clutch 14 and the pilot clutch 23, which is, specifically, the space defined by the inner circumferential surface of the front housing 12, the outer circumferential surface of the inner shaft 13, and the rear housing 30, is a liquid-tight space filled with lubricant oil. Thus, in the illustrated embodiment, the main clutch 14 and the pilot clutch 23 are each formed as a wet type friction clutch mechanism. That is, frictional engagement between the inner clutch plates 18 and the outer clutch plates 19 of the main clutch 14 and frictional engagement between the inner clutch plate 28 and the outer clutch plates 29 of the pilot clutch 23 are brought about with the lubricant oil in between.

The rear housing 30 has a magnet receiving groove 33 having a U-shaped cross-section. The opening of the magnet receiving groove 33 faces outward in the axial direction of the rear housing 30. The electromagnet 21 is received in the magnet receiving groove 33 in a state supported by a yoke 34 arranged around the electromagnet 21 and the rear housing 30, or, specifically, a bearing 35 formed in a cylindrical portion 30a of the rear housing 30. The cylindrical portion 30a extends axially outward from the central bore 31. The armature 22 is engaged with the inner circumferential surface of the front housing 12 through the splines with the pilot clutch 23 arranged between the armature 22 and the electromagnet 21 (and the rear housing 30). In this state, the armature 22 is supported in an axially movable manner.

Figure 4:
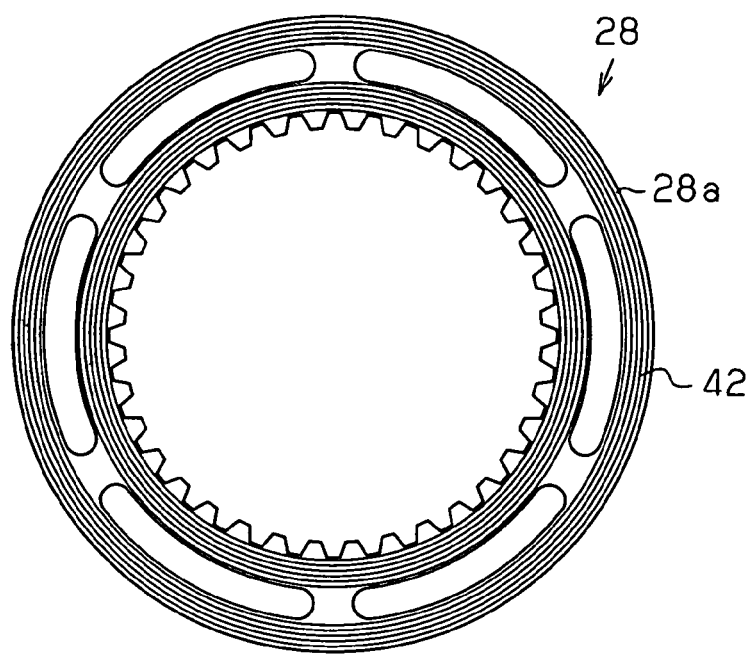
FIG. 4 is a plan view showing an inner clutch plate.
Figure 5:
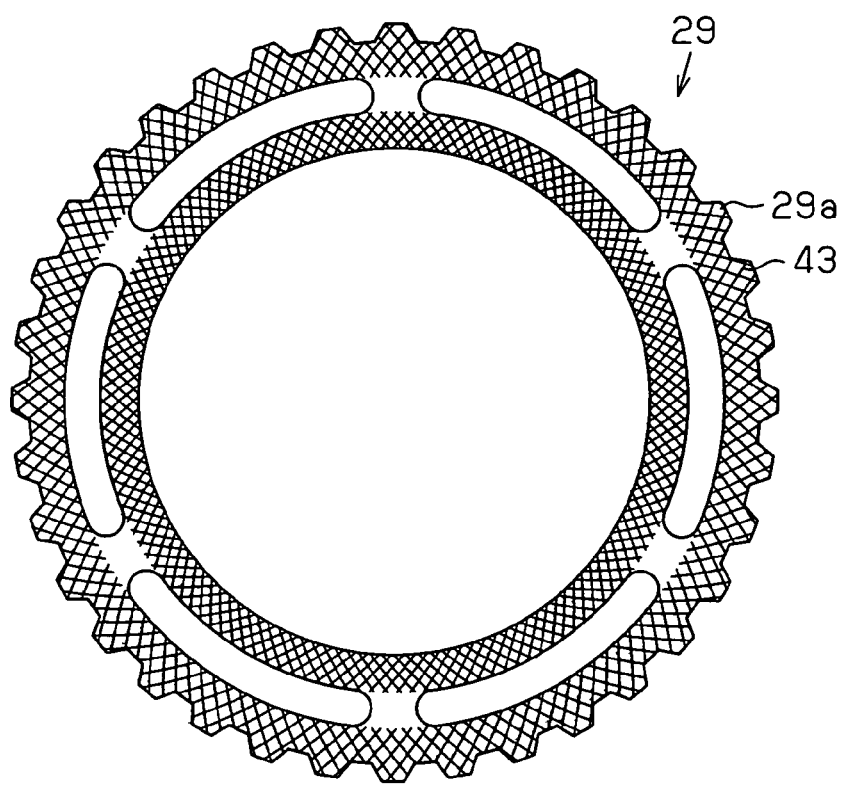
FIG. 5 is a plan view showing an outer clutch plate.

When the electromagnet 21 is energized, a magnetic field is generated around the electromagnet 21. The magnetic flux of the magnetic field flows along a magnetic path defined by the yoke 34, the rear housing 30, the outer peripheral portions of the inner clutch plate 28 and the outer clutch plates 29, the armature 22, and the inner peripheral portions of the inner clutch plate 28 and the outer clutch plates 29 in this order. That is, the magnetic path passes through sliding surfaces of the inner clutch plate 28 and the outer clutch plates 29. An annular non-magnetic body is fitted in and welded to a portion of the rear housing 30 facing the pilot clutch 23, thus preventing occurrence of a short circuit of the magnetic flux. As illustrated in FIGS. 4 and 5, a plurality of arcuate cutouts are defined in a portion of each of the inner and outer clutch plates 28, 29 between the outer and inner circumferential portions of the clutch plates 28, 29. The cutouts also prevent the occurrence of a short circuit of the magnetic flux.

By energizing the electromagnet 21 of the drive force transmission device 6, electromagnetic force is generated by the electromagnet 21. The electromagnetic force draws the armature 22 toward the electromagnet 21, thus causing frictional engagement of the pilot clutch 23. This rotates the first cam 25 and the second cam 26 of the cam mechanism 24 relative to each other. In this state, the second cam 26 moves toward the main clutch 14 separately from the first cam 25. The second cam 26 thus presses the inner clutch plates 18 to cause frictional engagement of the main clutch 14.

Therefore, by adjusting the energizing level of the electromagnet 21 and changing magnetic force generated by the electromagnet 21, the frictional engagement force of the pilot clutch 23 varies. This changes the relative rotational speed between the first and second cams 25, 26, or the force pressing the main clutch 14 (the inner clutch plates 18). Accordingly, through adjustment of the energizing level of the electromagnet 21, the frictional engagement force of the main clutch 14, or the drive force transmitted from the propeller shaft 5 to the pinion shaft 7, is regulated.

The structures of the drive force transmitting members (the clutch plates) of the friction clutch mechanisms (the inner clutch plates and the pilot clutch) have the following characteristics.

Figure 3:
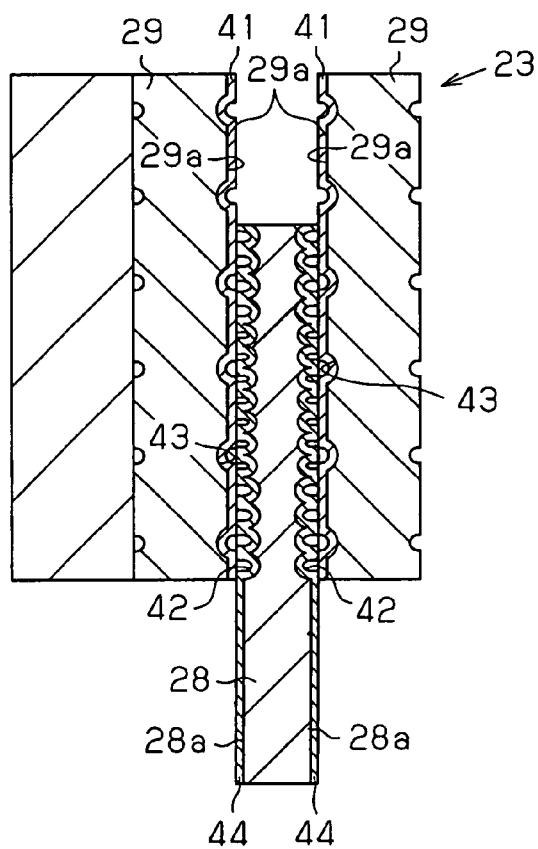
FIG. 3 is a cross-sectional view showing a pilot clutch.

As shown in FIGS. 3 to 5, in the illustrated embodiment, each of the inner and outer clutch plates 28, 29 is formed of magnetic metal (iron-based metal) in an annular shape. A DLC film (diamond-like carbon film) 41 is provided on a sliding surface 29a of each outer clutch plate 29. The DLC film 41 of the illustrated embodiment is formed by a DLC-Si film containing silicon. The content of Si in the DLS film is preferably 8 to 40 wt %. The hardness of the film is preferably 1000 Hv or greater. A plurality of fine grooves 42 are formed in opposed sliding surfaces 28a of the inner clutch plate 28. The fine grooves 42 are arranged circumferentially about the axis of the inner clutch plate 28, or the axis of relative rotation of the inner and outer clutch plates 28, 29. In the illustrated embodiment, each of the outer clutch plates 29 (19) forms a first drive force transmitting member. Each of the inner clutch plates 28 (18) forms a second drive force transmitting member.

Figure 6:
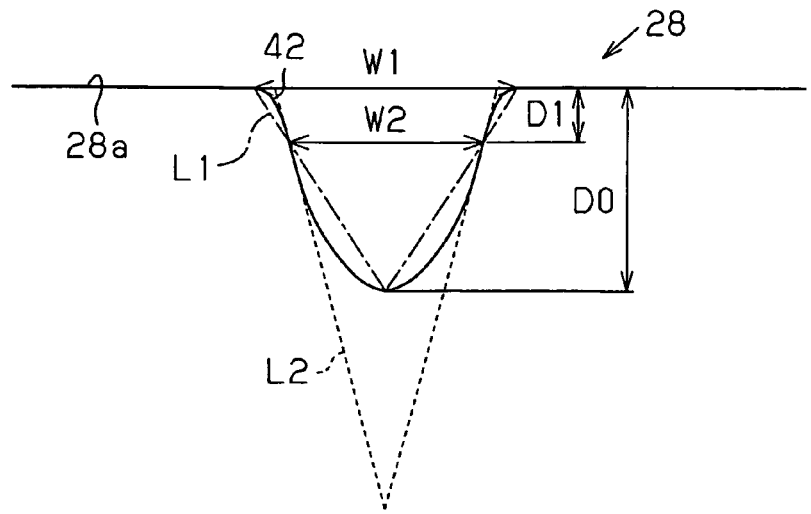
FIG. 6 is a cross-sectional view showing a fine groove.

Specifically, as shown in FIG. 6, each fine groove 42 of the illustrated embodiment is provided through pressing with a metal mold in such a manner that the depth of the fine groove 42, or the depth DO with respect to the bottom of the fine groove 42, at the initial stage of use becomes 15 μm or smaller. Specifically, the "initial stage of use" herein corresponds to an initial stage of market distribution of a drive force transmission device of the present invention. The average of the width W1 of each fine groove 42 at the surface of the sliding surface 28a is 15 μm to 45 μm. Also, the average of the width W2 of the fine groove 42 at a depth D1 (1.5 μm) from the surface of the sliding surface 28a is 15 μm to 45 μm. To suppress change of the drive force transmission characteristics of the drive force transmission device throughout the time of use assumed as life of the device from the initial stage of use, it is preferable that the average width of each fine groove 42 be 15 to 45 μm at the surface of the sliding surface 28a and the depth of 1.5 μm from the sliding surface 28a.

FIG. 6 shows the state of the sliding surface 28a of the inner clutch plate 28 at the initial stage of use. Specifically, after the fine grooves 42 have been formed in the sliding surface 28a through pressing, the sliding surface 28a is evened to cancel irregular bumps and recesses. The depth D1 corresponds to maximum wear of the inner clutch plate 28 caused by long-term use, or assumed life length of the inner clutch plate 28. In the illustrated embodiment, grid-like oil grooves 43 are formed in the sliding surface 29a of each outer clutch plate 29. The lubricant oil is discharged from the spaces between the clutch plates 28, 29 through the oil grooves 43 when the pilot clutch 23 is engaged. Further, an oxynitride film 44 is formed on each of the sliding surfaces 28a of the inner clutch plate 28.

Figure 7:
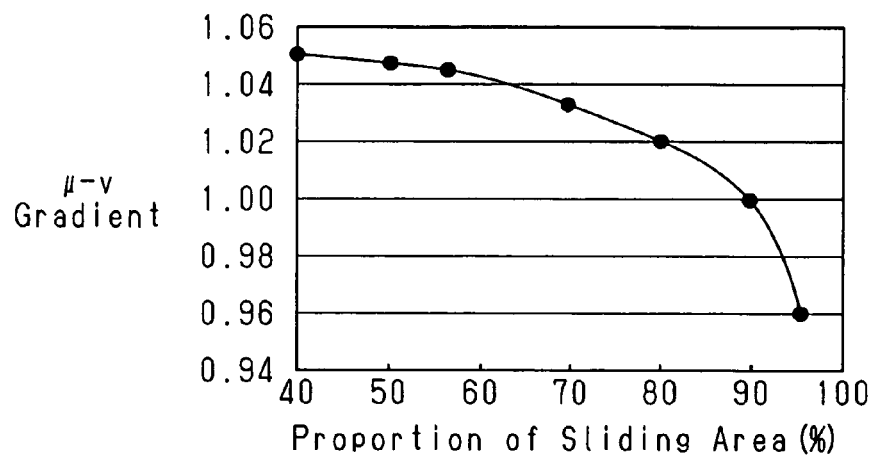
FIG. 7 is a graph representing μ-v gradient of a sliding surface versus proportion of a sliding area to the sliding surface.
Figure 9:
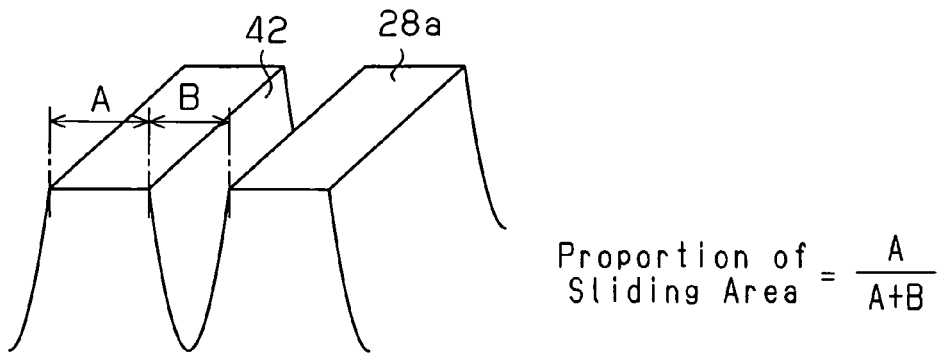
FIG. 9 is a view explaining the proportion of the sliding area to the sliding surface.

FIG. 7 is a graph representing μ-v gradient versus proportion of the sliding area to each sliding surface 28a of the inner clutch plate 28. The sliding area corresponds to the portions of the sliding surface 28a other than the portions corresponding to the fine grooves 42. As schematically illustrated in FIG. 9, the proportion of the sliding area to the sliding surface 28a is determined as the ratio of the surface area of the sliding area to the entire surface area of the sliding surface 28a. In FIG. 9, for the illustrative purposes, the dimension of each fine groove 42 in a direction defined by the width of the fine groove 42 with respect to the dimension of the fine groove 42 in a direction defined by the depth of the fine groove 42 is different from the actual value. The μ-v gradient is a characteristic line representing the relationship between the sliding speed v and the friction coefficient μ of the clutch plates 28, 29. If the friction coefficient μ becomes greater as the sliding speed v becomes greater, the μ-v gradient becomes greater than or equal to 1, or positive. As is clear from FIG. 7, the μ-v gradient becomes greater than or equal to 1, or positive, as long as the proportion of the sliding area is 90% or smaller. Generally, it is known that judder (irregular oscillation) can be suppressed regardless of change of the sliding speed v if the μ-v gradient is positive. The proportion of the sliding area to the sliding surface 28a of the inner clutch plate 28 must be 90% or smaller throughout use of the inner clutch plate 28.

Figure 8:
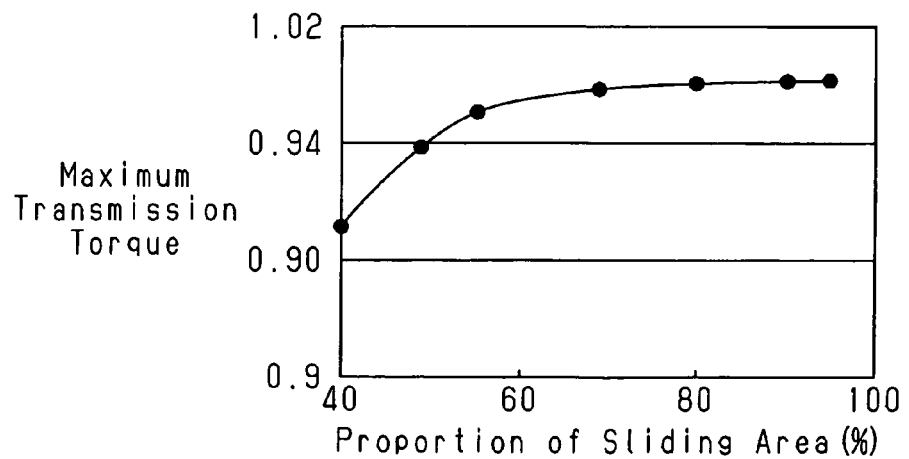
FIG. 8 is a graph representing a maximum transmission torque (a torque capacity) versus the proportion of the sliding area to the sliding surface.

FIG. 8 is a graph representing the maximum transmission torque (torque capacity) versus proportion of the sliding area to the sliding surface 28a of the inner clutch plate 28. As is made clear by the graph, the changing rate of maximum transmission torque becomes smaller if the proportion of the sliding area is 55% or greater. Specifically, if the sliding area per unit surface area of the sliding surface 28a is maintained at a certain level, surface pressure increases in inverse proportion to the size of the sliding area as the sliding area becomes smaller. This maintains the frictional force generated by the sliding surface 28a of the inner clutch plate 28, thus maintaining the change rate of maximum transmission torque to a relatively low level. Therefore, as long as the proportion of the sliding area to the sliding surface 28a of the inner clutch plate 28 is 55% or greater, the maximum transmission torque does not greatly vary regardless of change of the proportion of the sliding area caused by wear of the sliding surface 28a of the inner clutch plate 28. That is, by ensuring the proportion of the sliding area at the initial stage of use to be 55% or greater, change of the maximum transmission torque is limited to a smaller level regardless of increase of the proportion of the sliding area caused in a later stage of use. Further, if the proportion of the sliding area to the sliding surface 28a of the inner clutch plate 28 is preferably 60% or greater, or more preferably 70% or greater, at the initial stage of use, the change of the maximum transmission torque in the later stage of use is further suppressed.

Figure 10A:
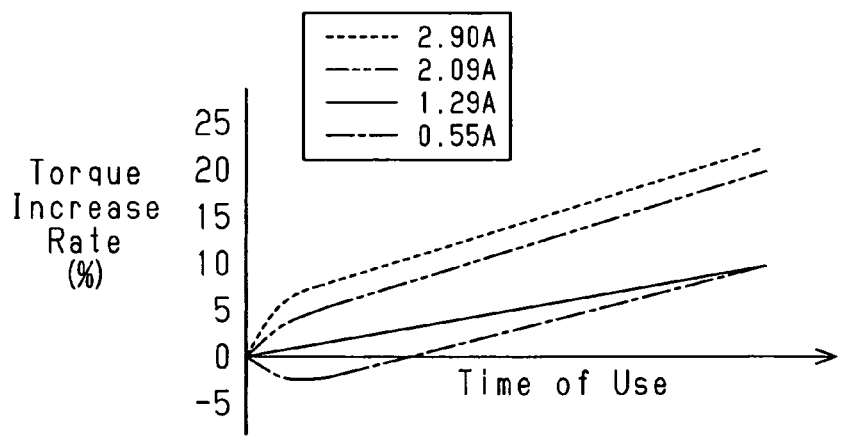
FIG. 10A is a graph representing change of drive force transmission characteristics after long-term use of a typical drive force transmission device.
Figure 10B:
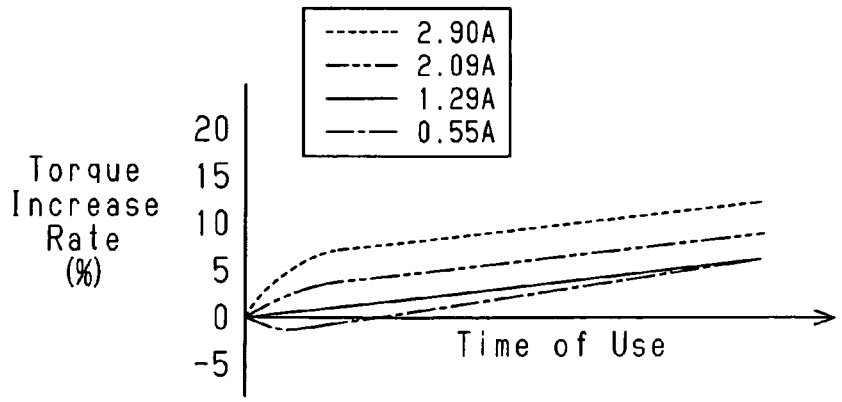
FIG. 10B is a graph representing change of drive force transmission characteristics after long-term use of the drive force transmission device according to the present invention.

Operation of the drive force transmission device 6 according to the present invention will hereafter be described. FIG. 10A is a graph representing change of the drive force transmission characteristics of a drive force transmission device having an outer clutch plate including a DLC film and an inner clutch plate in which the proportion of the sliding area to the sliding surface is 50% and the depth of each fine groove is 20 μm at the initial stage of use. FIG. 10B is a graph representing change of the drive force transmission characteristics of a drive force transmission device of the present invention having an outer clutch plate including a DLC film and an inner clutch plate in which the proportion of the sliding area to the sliding surface is 55% and the depth of each fine groove is 15 μm at the initial stage of use. In the graphs, the change rate of the torque transmission (the torque increase rate) from the torque transmission at the initial stage of use, which corresponds to the axis of ordinate, is shown versus the time of use. The electric current values of the graphs from 0.55 to 2.90A represent the energizing levels of the electromagnet 21. As is clear from the graphs, the change of the transmission torque as the time elapses is suppressed by increasing the proportion of the sliding area to the sliding surface of the inner clutch plate and decreasing the depth of each fine groove. This suppresses changes of the drive force transmission characteristics over time.

The proportion of the sliding area to the sliding surface 28a of the inner clutch plate 28 is 55 to 90% at the initial stage of use and the stage of use corresponding to wear of 1.5 μm with respect the initial stage. Specifically, the average width of each fine groove 42 of the inner clutch plate 28 at the initial stage of use is 15 to 45 μm both at the surface of the sliding surface 28a and at the depth of 1.5 μm from the surface. The width of each fine groove 42 is thus maintained optimal throughout a long-term use of the drive force transmission device from the initial stage of use. This ensures a long-term effect of the fine grooves 42, which reduce the excessive thickness of the oil film between the sliding surfaces 28a, 29a. The drive force transmission characteristics are thus maintained optimal. Further, since the depth of each fine groove 42 is 15 μm or smaller, the fine grooves 42 are provided through pressing without allowing the material of the inner clutch plate 28 to run from the fine grooves 42 to the other portions of the inner clutch plate 28. As a result, the fine grooves 42 having an optimal, or substantially rectangular cross-sectional shape can be provided effectively.

Each of the fine grooves 42 extends circumferentially about the rotational axis of the inner clutch plate 28. The fine grooves 42 thus effectively reduce the excessive thickness of the oil film between the sliding surfaces 28a, 29a. Such fine grooves 42 are advantages in improvement of the drive force transmission characteristics.

The present invention may be embodied in the following modified forms.

In the illustrated embodiment, the DLC film (the diamond-like carbon film) 41 is formed on the sliding surface 29a of each outer clutch plate 29. The fine grooves 42 are formed in each sliding surface 28a of the inner clutch plate 28. However, the fine grooves 42 may be formed in the sliding surface 29a of each outer clutch plate 29, while the DLC film 41 is provided on each sliding surface 28a of the inner clutch plate 28.

Although the DLC film 41 of the illustrated embodiment is formed by the DLC-Si film containing silicon, a DLC film free from silicon may be employed as the DLC film 41.

In the illustrated embodiment, the fine grooves 42 are arranged circumferentially about the axis of the inner clutch plate 28, or the axis of rotation of the inner clutch plate 28 relative to the outer clutch plates 29. However, the fine grooves 42 may be provided in a grid-like shape, instead of circumferential arrangement.

Although the fine grooves 42 of the illustrated embodiment are provided through pressing with a metal mold, the fine grooves 42 may be formed by any other suitable method.

In the illustrated embodiment, the present invention is applied to a pilot clutch of a drive force transmission device that transmits drive force to the sub drive wheels (the rear wheels) of a four-wheel-drive vehicle. However, the present invention may be applied to a synchronizer ring for manual transmission or a CVT of a vehicle. Further, the present invention is not restricted to a device that transmits drive force of a vehicle.

The present examples and embodiments are to be considered as illustrative and not restrictive and the invention is not to be limited to the details given herein, but may be modified within the scope and equivalence of the appended claims.

The invention claimed is:

1. A device that transmits drive force through frictional engagement between a first drive force transmitting member and a second drive force transmitting member, which are rotatable relative to each other about a common rotational axis, with a lubricant oil provided between the first and second drive force transmitting members, wherein the first and second drive force transmitting members each have a sliding surface, the sliding surfaces facing each other, a diamond-like carbon film being formed on the sliding surface of the first drive force transmitting member, a fine circumferential groove being formed in the sliding surface of the second drive force transmitting member, and wherein the proportion of a sliding area to the sliding surface of the second drive force transmitting member at an initial stage of use is 55 to 90%,
wherein the fine groove of the second drive force transmitting member at the initial stage of use has a depth of 15 μm or smaller and an average width of 15 to 45 μm at the surface of the sliding surface and at the depth of 1.5 μm from the surface of the sliding surface.

2. The device according to claim 1, wherein the proportion of the sliding area to the sliding surface of the second drive force transmitting member is 55 to 90% at a stage of use corresponding to wear of 1.5 μm with respect to the initial stage of use.

3. The device according to claim 1, wherein the fine groove is provided through pressing.

4. The device according to claim 1, wherein the fine groove extends circumferentially about the rotational axis.

5. The device according to claim 1, further comprising an electromagnetic drive mechanism that generates electromagnetic force acting to press the first and second drive force transmitting members against each other.

6. The device according to claim 1, wherein a width of the fine groove formed in the second drive force transmitting member decreases from the sliding surface toward the bottom of the groove.

7. A device that transmits drive force through frictional engagement between a first clutch plate and a second clutch plate, which are rotatable relative to each other about a common rotational axis, with a lubricant oil provided between the first and second clutch plates, wherein the first and second clutch plates each have a sliding surface, the sliding surfaces face each other, a diamond-like carbon film being formed on the sliding surface of the first clutch plate, a fine circumferential groove being formed in the sliding surface of the second clutch plate, and wherein the proportion of a sliding area to the sliding surface of the second clutch plate is 55 to 90% both at an initial stage of use and at a stage of use corresponding to wear of 1.5 μm with respect to the initial stage of use, wherein the fine groove of the second clutch plate at the initial stage of use has a depth of 15 μm or smaller and an average width of 15 to 45 μm at the surface of the sliding surface and at the depth of 1.5 μm from the surface of the sliding surface.

8. The device according to claim 7, wherein a width of the fine groove formed in the second clutch plate decreases from the sliding surface toward the bottom of the groove.

* * * * *